United States Patent
Ito et al.

(10) Patent No.: US 8,845,158 B2
(45) Date of Patent: Sep. 30, 2014

(54) VEHICLE LAMP HAVING TEXTURED SURFACE

(71) Applicants: Hiroya Ito, Shizuoka (JP); Takahiro Kohata, Shizuoka (JP); Toshimasa Ikeda, Shizuoka (JP)

(72) Inventors: Hiroya Ito, Shizuoka (JP); Takahiro Kohata, Shizuoka (JP); Toshimasa Ikeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 13/746,431

(22) Filed: Jan. 22, 2013

(65) Prior Publication Data

US 2013/0194817 A1 Aug. 1, 2013

(30) Foreign Application Priority Data

Jan. 30, 2012 (JP) ................. 2012-016399

(51) Int. Cl.
*B60Q 1/04* (2006.01)
*F21V 7/22* (2006.01)
*B29C 45/00* (2006.01)
*B60Q 1/02* (2006.01)
*F21S 8/10* (2006.01)
*B29C 45/37* (2006.01)
*B29L 11/00* (2006.01)

(52) U.S. Cl.
CPC .............. *B60Q 1/02* (2013.01); *B29C 45/0025* (2013.01); *B29L 2011/0083* (2013.01); *B29C 45/372* (2013.01); *F21S 48/15* (2013.01)
USPC ............ 362/516; 362/348; 362/507; 362/538

(58) Field of Classification Search
CPC ........ B29C 45/372; F21S 48/13; F21S 48/15; F21S 48/25; F21S 18/1376; F21S 48/1394; F21V 7/22
USPC .................. 362/348, 487, 506, 507, 516, 538; 264/328.14, 328.16
See application file for complete search history.

(56) References Cited

U.S. PATENT DOCUMENTS

2004/0136196 A1* 7/2004 Akiyama ....................... 362/487
2011/0052876 A1* 3/2011 Suzuki et al. ................. 428/156
2011/0273888 A1* 11/2011 Ferenc .......................... 362/294

FOREIGN PATENT DOCUMENTS

JP 2008-71556 A 3/2008

* cited by examiner

*Primary Examiner* — Nimeshkumar Patel
*Assistant Examiner* — Steven Horikoshi
(74) *Attorney, Agent, or Firm* — Sughrue Mion, PLLC

(57) ABSTRACT

A vehicle lamp includes a light source, and a resin component disposed on the periphery of the light source. The resin component has a designed surface that can be observed from the outside of the lamp. The designed surface includes a textured surface having minute irregularities, and a projecting portion provided adjacent to the textured surface.

4 Claims, 9 Drawing Sheets

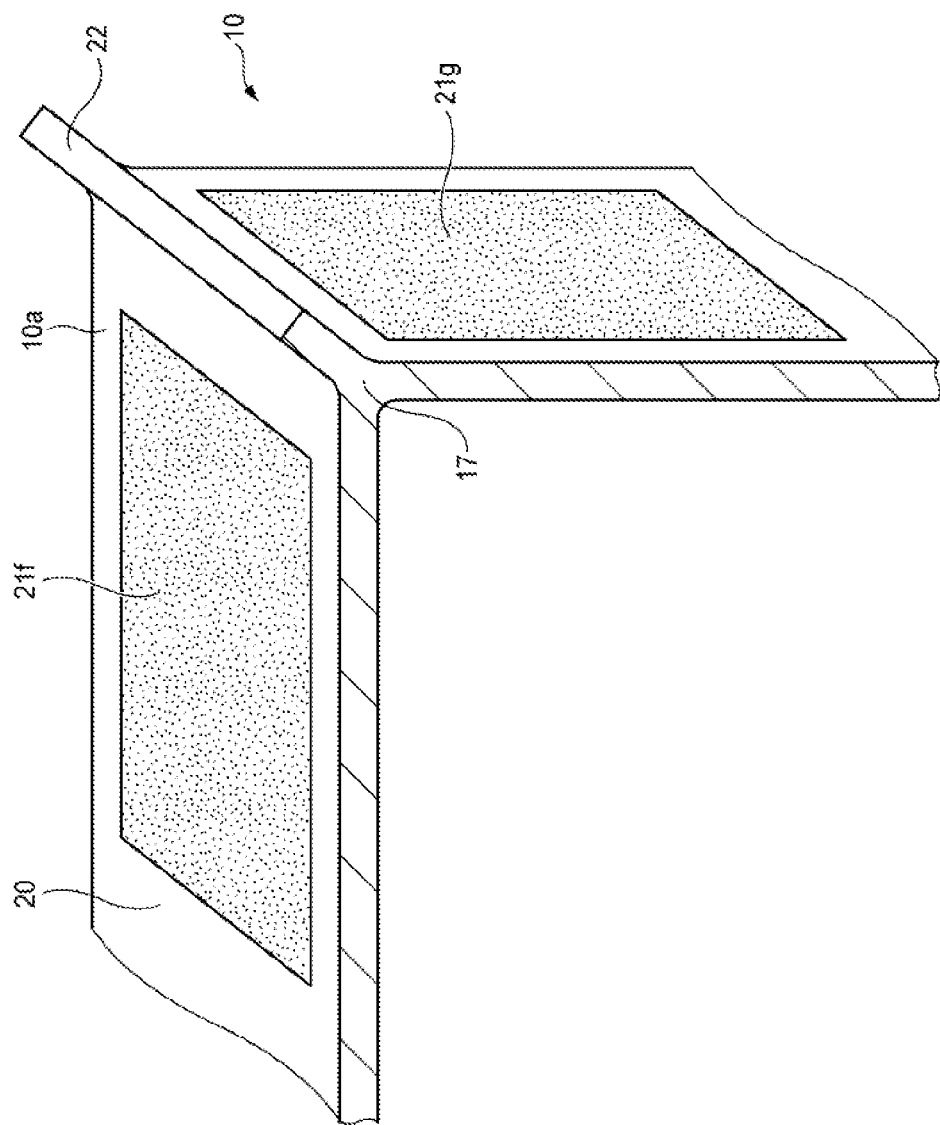

VEHICLE LAMP HAVING TEXTURED SURFACE

CROSS-REFERENCE TO RELATED APPLICATION(S)

The present application claims the benefit of priority of Japanese Patent Application No. 2012-016399, filed on Jan. 30, 2012. The disclosures of the application are incorporated herein by reference.

BACKGROUND

1. Technical Field

The present disclosure relates to a vehicle lamp including a resin component having a texturing formed on a designed surface and a method for manufacturing the vehicle lamp.

2. Related Art

Various vehicle lamps having different external appearances have been proposed. In recent years, for enhancement of the design properties of a vehicle lamp, in addition to changing the configuration of a vehicle lamp such as changing the position of a light source or the shape of a reflector, it is proposed to form a texturing on a designed surface of a constituent member such as an extension that is exposed to the front of the lamp. The texturing means a portion where minute irregularities are formed on a surface thereof to give a matt appearance by irregular reflection of light.

Patent Literature 1 proposes the formation of the texturing on a resin component such as a reflector or an extension by transferring a pattern of a minute irregularities provided on a mold to a surface of the resin component when the resin component is molded using the mold with the minute irregularities.

RELATED ART LITERATURE

Patent Literature

[Patent Literature] JP-A-2008-71556

However, when the texturing is formed in the way described in Patent Literature 1, there have been situations where texturing irregularity is generated in a resin component. Once generated, the texturing irregularity deteriorates the appearance of a resin component, reducing the yield of resin components.

SUMMARY

Exemplary embodiments of the invention provide a vehicle lamp including a resin component where the generation of texturing irregularity is suppressed and a method for manufacturing such a vehicle lamp.

A vehicle lamp according to an exemplary embodiment of the invention, composes:

a light source; and a resin component disposed on the periphery of the light source, the resin component having a designed surface that can be observed from the outside of the lamp, wherein the designed surface comprises a textured surface having minute irregularities; and a projecting portion provided adjacent to the textured surface.

The projecting portion may have at least a pair of projecting portions provided in positions which face each other oppositely with the textured surface held therebetween.

The textured surface may have a plurality of textured surfaces formed on the designed surface, and the projecting portion may be provided at the boundary between the plurality of textured surfaces.

A height of the projecting portion may be equal to or larger than 0.2 mm and equal to or smaller than a thickness of the resin component at the portion where the textured surface is formed.

A method for manufacturing a resin component of a vehicle lamp having a designed surface including a textured surface and a projecting portion, according to an exemplary embodiment of the invention, comprises:

preparing a first mold and a second mold, the first mold having a surface with minute irregularities and a recess portion provided adjacent to the surface with minute irregularities;

disposing the first mold and the second mold so as to define a cavity; and applying a resin into an interior of the cavity and then cooling the resin so that a pattern of the surface with minute irregularities is transferred to the resin in the cavity to form the textured surface, wherein in the cooling the contraction of the textured surface that occurs in association with the cooling of the resin component is suppressed by bringing the first mold into abutment with the projecting portion that is formed by the recess portion.

According to the vehicle lamp according to the invention, the projecting portion functions to suppress the occurrence of a surface contraction in the textured surface which results in association with the cooling of the resin while the resin component is molded. Consequently, it is possible to suppress the occurrence of a texturing irregularity which results from the surface contraction which results in association with the cooling of the resin when the resin component is molded.

Additionally, according to the resin molding mold for the resin component of the vehicle lamp according to the invention, a projecting portion for suppressing a texturing irregularity is formed by the recess portion that is recessed from the surface with minute irregularities so as to suppress the surface contraction in the textured surface which occurs in association with the cooling of the resin while the resin component is resin molded. Consequently, it is possible to provide a resin molding mold that can suppress the occurrence of a texturing irregularity.

In addition, according to the method for manufacturing the resin component of the vehicle lamp according to the invention, since the projecting portion that is formed by the recess portion suppresses the surface contraction of the textured surface that occurs in association with the cooling of the resin component, it is possible to suppress the occurrence of a texturing irregularity which results from the surface contraction of the textured surface.

BRIEF DESCRIPTION OF THE DRAWINGS

FIG. 9 is a partial enlarged view of an extension of a vehicle lamp according to a third modified example of the embodiment.

DETAILED DESCRIPTION (Overall Configuration)

Hereinafter, a vehicle lamp according to an embodiment of the invention will be described by reference to FIGS. 1, 2.

Figure 1:
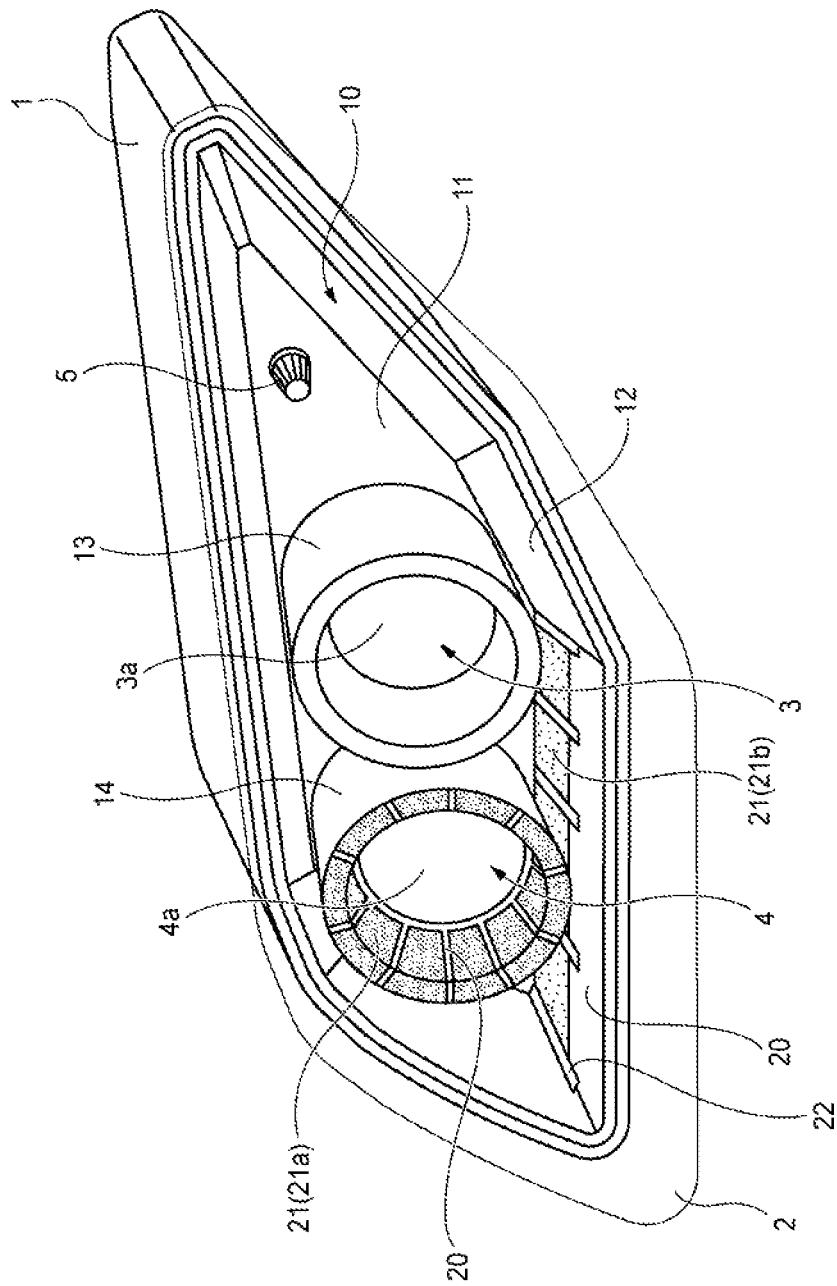
FIG. 1 is a perspective view of a vehicle lamp according to the embodiment of the invention.

FIG. 1 is a perspective view of a vehicle lamp according to the embodiment of the invention. As shown in FIG. 1, the vehicle lamp includes a lamp body 1 having an opening that is opened to the front of the lamp and a transparent outer cover 2. The outer cover 2 is disposed so as to close the opening in the lamp body from the front. Then, a lamp chamber is defined between the lamp body 1 and the outer cover 2.

A high beam lamp unit 3 for irradiating a high beam and a low beam lamp unit 4 for irradiating a low beam are disposed within the lamp chamber. FIG. 2 is a vertical sectional view of the vehicle lamp taken along a section that contains the low beam lamp unit 4. As shown in FIG. 2, the low beam lamp unit 4 is a projector-type lamp unit and includes a light source 4b made up of an LED, a projection lens 4a and a reflector 4c. Note that the high beam lamp unit 3 (refer to FIG. 1) also has the same configuration as that of the low beam lamp unit 4. Additionally, as shown in FIG. 1, in the lamp chamber, a turn signal lamp 5 is provided near a transverse end portion thereof.

In the lamp chamber, as shown in FIG. 1, an extension 10 (a resin component) is provided so as to cover the lamp body 1 with a projection lens 3a of the high beam lamp unit 3, the projection lens 4a of the low beam lamp unit 4 and the turn signal lamp 5 exposed to the front when looking at the lamp from a front side thereof. The extension 10 is a resin member that is formed from a crystalline resin such as PBT (polybutylene terephthalate) or PET (polyethylene terephthalate).

A surface of the extension 10 that is exposed to the front of the lamp is formed as a designed surface 10a. The designed surface 10a is a surface that can be observed from the outside of the lamp. Formed on the designed surface 10a are smooth and glossy mirror-finished surface portions 20, less glossy textured surfaces 21 and ribs (projecting portions) 22 that are provided adjacent to the textured surfaces 21. The textured surface 21 is a surface on which the texturing is formed and is formed as a surface with minute irregularities (minute concavo-convex surface) to give a matt appearance through irregular reflection of light. The textured surface 21 can be made up of, for example, spot-like minute projections and minute recesses. Alternatively, the textured surface 21 may be made up of minute ridges and roots that extend in one direction. In this embodiment, almost the whole area of the designed surface 10a of the extension 10 is formed as the mirror-finished surface portions 20, and the textured surfaces 21 are formed on portions of the designed surface 10a. Additionally, the ribs 22 are formed so as to project from the designed surface 10a at positions adjacent to the textured surfaces 21 in such a manner as to be disposed between the plurality of textured surfaces 21 to thereby divide them.

Figure 2:
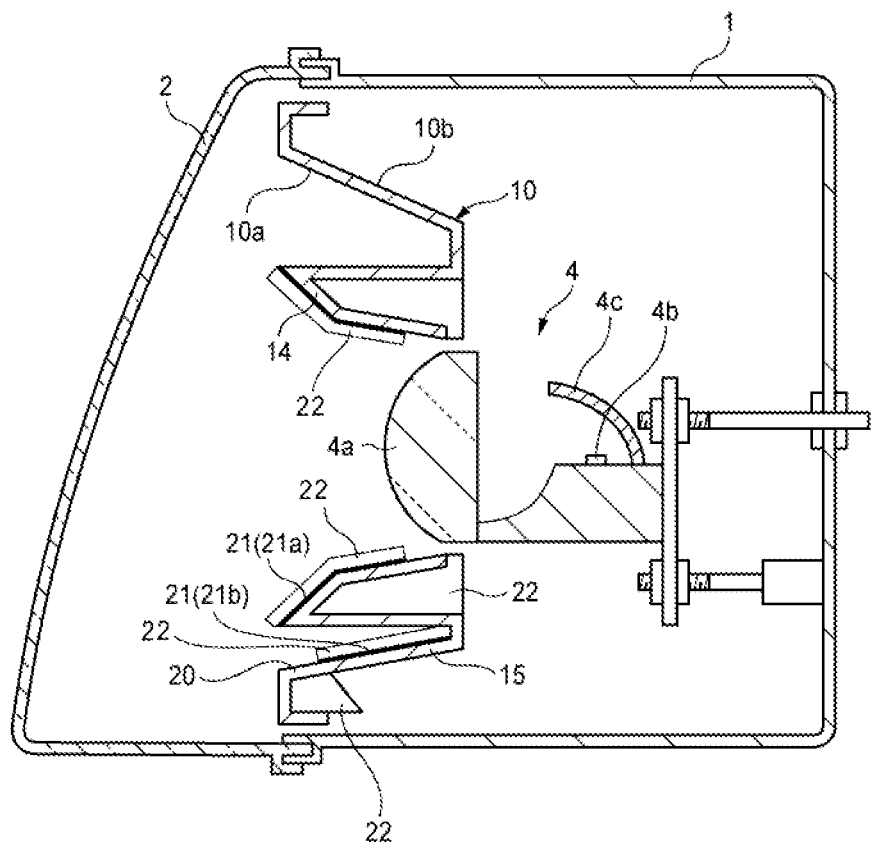
FIG. 2 is a sectional view of the vehicle lamp taken along a section that contains a low beam lamp unit.

As shown in FIGS. 1, 2, the extension 10 includes a bottom surface portion 11 from which the projection lens 4a of the low beam lamp unit 4, the projection lens 3a of the high beam lamp unit 3 and the turn signal lamp 5 are exposed and an inclined portion 12 that surrounds the bottom surface portion 11 and which extends to the front from an outer edge of the bottom surface portion 11.

In addition, a first cylindrical portion 13 and a second cylindrical portion 14 are provided on the bottom surface portion 11 so as to project to the front therefrom. The first cylindrical portion 13 surrounds the projection lens 3a of the high beam lamp unit 3 and the second cylindrical portion 14 surrounds the projection lens 4a of the low beam lamp unit 4. Designed surfaces 10a of these first cylindrical portion 13 and second cylindrical portion 14 are formed into inclined surfaces that extend towards the front from the projection lens 3a, 4a while expanding diametrically.

First textured surfaces 21a, which each have a substantially rectangular shape, are formed at a plurality of locations on the designed surface 10a of the second cylindrical portion 14. When looking at the lamp from the front thereof, the plurality of first textured surfaces 21a are disposed radially with respect to an optical axis of the low beam lamp unit 4. In addition, these first textured surfaces 21a are divided by a plurality of ribs 22 in a radial fashion. In this way, since the first textured surfaces 21a are divided by the ribs 22 that are formed on the designed surface 10 so as to rise therefrom the extension 10 can be formed as an extension having a good external appearance in which the textured surfaces 21a are emphasized.

In addition, second textured surfaces 21b are provided on part of an area of the frame-shaped inclined portion 12 that is situated under the first cylindrical portion 13 and the second cylindrical portion 14. These second textured surfaces 21b, which each have a substantially rectangular shape, are aligned in a transverse direction, and ribs 22 are formed so as to divide the plurality of rectangular textured surfaces 21b. The second textured surface 21b has a surface roughness that differs from that of the first textured surface 21a and hence exhibits a different external appearance from that of the first textured surface 21a.

In this way, in the vehicle lamp according to the embodiment, the appearance of the vehicle lamp is enhanced by mixing the mirror-finished surface portions 20, the first textured surfaces 21a and the second textured surfaces 21b together on the designed surfaces 10a. of the extension 10. Note that in the following description, when the first textured surfaces 21a and the second textured surfaces 21b do not have to be discriminated, they are referred to simply as the textured surfaces 21.

(Mechanism for Generating Texturing Irregularity)

Figure 3:
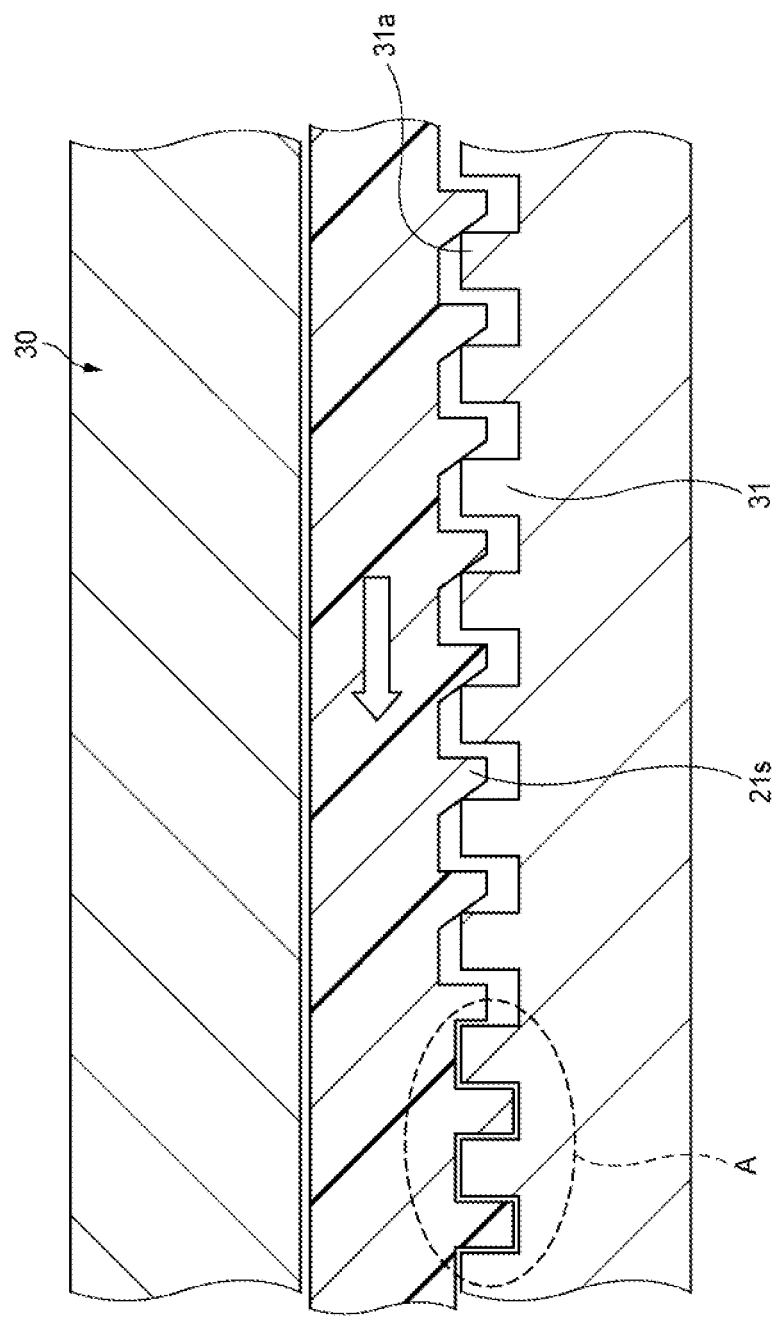
FIG. 3 is an exemplary diagram showing a mechanism of generating texturing irregularity.

In the vehicle lamp that is configured as described above, when a texturing irregularity is generated in the textured surfaces 21, the appearance of the vehicle lamp is deteriorated, which is not preferable. In general, a textured surface 21 is formed on a resin component such as the extension 10 by transferring a pattern of minute irregularities provided on a resin molding mold to a surface of the resin component when the resin component is molded using the mold. In forming the textured surface 21, when a desired pattern of minute irregularities is not transferred to the resin component, the irregular reflection of light is not brought about uniformly on the textured surface 21, and hence, light is reflected strongly in a specific direction, resulting in a situation where a striped pattern of light and dark lines becomes visible due to a difference in reflectance factor between the textured surface 21 where the proper irregular reflection is not brought about and adjacent normal textured surfaces 21 where the proper irregular reflection is brought about. This striped pattern that becomes visible with no intention is referred to as a texturing irregularity Then, the inventors have found that a texturing irregularity is brought about by the following mechanism. FIG. 3 is an exemplary diagram showing how to resin mold an extension 10 according to a comparison example.

In general, a resin component such as the extension 10 is manufactured through resin molding. In resin molding, when a liquid resin that is injected into a cavity in a mold 30 is cooled so as to be cured, contraction takes place in the resin. Since the extension 10 is formed as a plate-shaped member, a dimension in a surface direction (in a horizontal direction in the figure) is larger than a dimension in a thickness direction. Because of this, a larger contraction force is applied in the surface direction in the resin.

In the midst of resin molding like this, there may occur a situation in which the resin strongly sticks to the surface of part of the mold 30 (an area denoted by A in the figure). For example, when the temperature of part of the mold 30 is low, the resin is secured to a low-temperature area of the mold 30 or when a resin flowing at higher speeds is pressed strongly against the surface of the mold 30 near the injection port, part of the resin sticks strongly to the surface of the mold 30. In particular, a texturing transfer portion 31 that forms a textured surface 21 and which is made up of minute irregularities has a large contact area with the resin, and hence, the resin tends to stick easily to the texturing transfer portion 31. Because of this, the sticking of resin to the mold 30 tends to easily take place at the texturing transfer portion 31.

When the resin within the cavity is cooled and then contracts, the resin is deformed to move so as to be drawn towards the portion where the resin sticks strongly to the surface of the mold 30. When the resin moves in such a way, raised portions 21s on the textured surface 21 formed come into contact with raised portions 31a on the texturing transfer portion 31 of the mold 30 to thereby be deformed. As a result, as shown in FIG. 3, the raised portions 21s so drawn are formed to be inclined on a drawn side thereof. The raised portions 21s that are formed inclined in the way described above reflect light in a specific direction. As a result, the inclined areas of the raised portions 21s are visualized as a texturing irregularity of a striped pattern of lines.

In particular, as has been described above, since the textured surface 21 tends to stick easily to the texturing transfer portion 31 of the mold 30, the resin moves so as to be collected around the textured surface 21. As this occurs, a concentric texturing irregularity takes place about the area where the resin sticks to the mold 30 on the textured surface 21. Since the concentric texturing irregularity tends to be conspicuous, the external appearance of the extension 10 is largely impaired. In addition to this, when the whole of the resin contracts out of balance due to a variation in temperature of the mold 30, the raised portions 21s are deformed at different angles area by area as the contraction amount differs. As this occurs, light is reflected at the areas which contract differently in different directions which are specific to the respective areas, whereby a striped texturing irregularity becomes visible as a whole.

Note that the texturing irregularity takes place due to the minute raised portions 21s on the textured surface 21 being deformed. Therefore, even in the event that a migration of resin takes place in a mirror-finished surface portion 20, no texturing irregularity takes place therein. This is because even in the event that the resin moves while in contact with the mold 30 in the mirror-finished surface portion 20 having the smooth surface, the surface thereof is not deformed.

(Function of Ribs)

Then, the inventors attempted to find out conditions under which the occurrence of a texturing irregularity can effectively be suppressed by carrying out experiments by changing variously molding conditions such as the resin cooling speed, pressure for holding the resin at a constant pressure within the mold and injection speed of resin into the mold. However, the occurrence of a texturing irregularity could not be suppressed effectively even by setting the molding conditions variously. Then, the inventors studied about the addition of a structure to the extension 10 to suppress the surface contraction of the textured surface 21 instead of changing the molding conditions.

Figure 4:
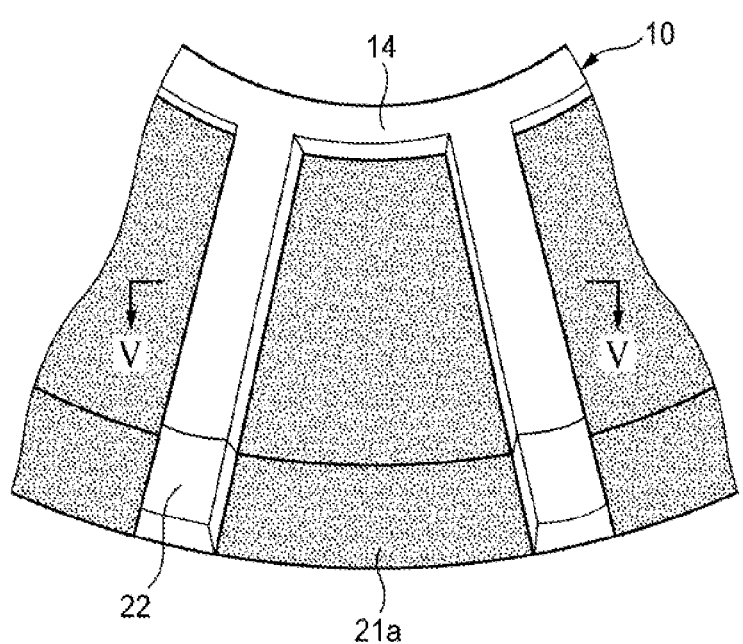
FIG. 4 is a partial enlarged view of an extension of the vehicle lamp shown in FIG. 1.

FIG. 4 is a front view of part of the designed surface 10a provided on the second cylindrical portion 14 of the extension 10.

As shown in FIG. 4, the first textured surfaces 21a each having the substantially rectangular shape are formed on the designed surface 10a of the second cylindrical portion 14 of the extension 10 so as to extend radially with respect to the optical axis of the low beam lamp unit 4. In addition, the linear ribs 22 are provided adjacent to outer edges of the first textured surfaces 21a so as to surround the textured surfaces 21a. Additionally, these ribs 22 are provided so as to face each other with the textured surface 21a held therebetween.

Figure 5:
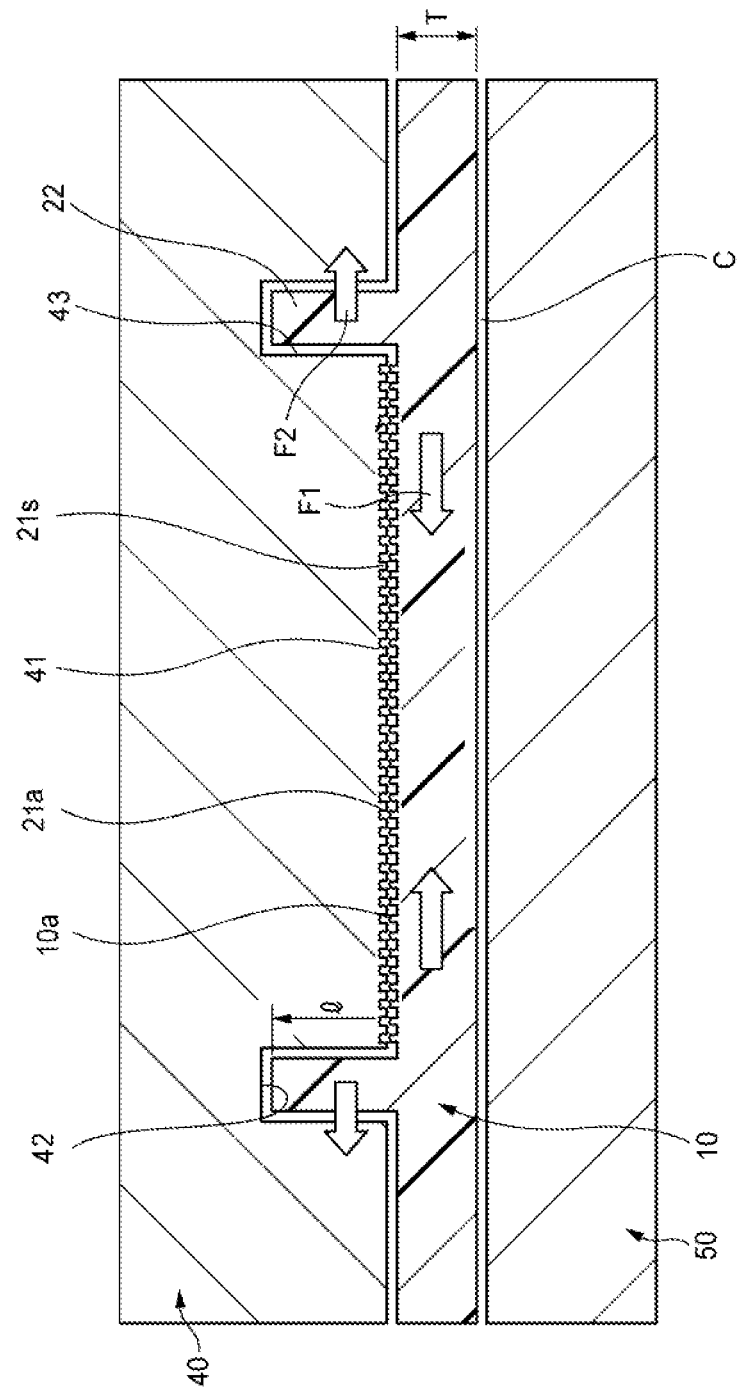
FIG. 5 is an exemplary diagram showing a process of manufacturing, the extension shown in FIG. 4.

Referring to FIG. 5, a manufacturing method according to the embodiment of the invention for an extension 10 provided with first textured surfaces 21a will be described. FIG. 5 is a sectional view taken along the line V-V and seen in a direction indicated by arrows attached thereto in FIG. 4. In FIG. 5, arrows F1, F2 denote stresses applied to a resin while the extension 10 is being molded. Note that in FIG. 5, minute irregularities at a texturing transfer portion 41 of a mold are exaggerated and are depicted larger than their actual size.

In manufacturing an extension 10, an upper mold (a designed surface side mold) 40 which includes a texturing transfer portion 41 and rib forming recess portions 42 and a lower mold 50 (a non-designed-surface side mold) which defines a cavity C between the upper mold 40 and itself are prepared. The texturing transfer portion 41 includes a surface provided with minute irregularities, and the rib forming recess portions 42 are formed into a shape which is recessed from the surface with minute irregularities at outsides of the texturing transfer portion 41. Next, the upper mold 40 and the lower mold 50 are assembled together to define the cavity C, a resin as a raw material is caused to flow into an interior of the cavity C, and the resin is cooled to be cured to manufacture the extension 10.

As shown in FIG. 5, when the resin is cooled, a textured surface 21 is formed by the texturing transfer portion 41, and ribs 22 are formed by the rib forming recess portions 42, the textured surface 21 and the ribs 22 being formed integrally as an extension 10. On the designed surface 10a of the extension 10, the pair of ribs 22 hold the first textured surface 21a therebetween. This enables the pair of ribs 22 to produce a reaction force F2 against a compression force F1 that is applied to the resin when the resin is cooled. Note that the pair ribs 22 are strongly supported by side walls 43 of the upper mold 40 which the pair of ribs 22 hold therebetween, and therefore, the ribs 22 are not deformed by the compression force F1.

Consequently, even in the event that the compression force F1 is applied to the resin so as to produce a surface contraction of the whole of the resin as shown in the figure, the ribs 22 produces the reaction force F2 so as to prevent the movement of the textured surface 21, whereby the compression force F1 is cancelled by the reaction force F2, this preventing the deformation of raised portions of the textured surface 21 which would otherwise occur in association with the movement of the resin. Consequently, according to the extension 10 of the vehicle lamp according to the embodiment, the occurrence of texturing irregularity can be suppressed by the ribs 22. Here, the surface contraction means that the extension 10 contracts in the thickness direction and the vertical direction.

In particular, according to the extension 10 of the vehicle lamp according to this embodiment, as shown in FIG. 4, the pair of ribs 22 are provided symmetrically with respect to the textured surface 21, whereby the textured surface 21 is held by the pair of ribs 22 therebetween. By adopting this configuration, even in the event that part of the textured surface 21 sticks to the mold to apply the compression force so that the textured surface 21 is drawn towards the center, the pair of ribs 22 can produce a reaction force from each side, thereby making it possible to suppress the occurrence of texturing irregularity over the whole of the textured surface 21.

It is preferable that an outer surface of the rib 22 is mirror-finished. As has been described above, with the outer surface of the rib 22 mirror-finished, even in the event that the resin moves as it is cooled, the external appearance of the outer surface is not affected in any way. Consequently, by causing the decorative ribs 22 to be visible together with the textured surfaces 21, it is possible to provide the extension 10 having the superior design properties.

In addition, a height l of the rib 22 is preferably equal to or lager than 0.2 mm and also equal to or smaller than a thickness T of the extension 10 at the portion where the textured surface 21 is formed. When the height l of the rib 22 is smaller than 0.2 mm, the rib 22 cannot bear the compression force F1. On the other hand, when the height l of the rib 22 is larger than the thickness T of the extension 10, a sink mark is produced on a rear side of the designed surface 10a in a position corresponding to the rib 22 when the extension 10 is resin molded, and hence, the strength of the rib 22 cannot be ensured. In addition, when the height l of the rib 22 is larger than the thickness T of the extension 10, there may be a situation in which a depression is formed in the designed surface 10a at a portion corresponding to the rib 22. In the event that this depression becomes visible, the external quality of the extension 10 is deteriorated. Because of this, the height l of the rib 22 is preferably made smaller than the thickness T of the extension 10.

Additionally, when the extension 10 is formed from a crystalline resin having a relatively large mold shrinkage factor of 10/1000 to 20/1000, since the resin tends to shrink, a texturing irregularity occurs easily. However, as in the extension 10 of the vehicle lamp according to this embodiment, by forming the ribs 22, the occurrence of a texturing irregularity can be suppressed effectively. In addition, when a crystalline resin is used, since the viscosity of the resin is low, it is possible to form a thin extension 10.

Additionally, when the textured surface 21 is formed as a surface with minute irregularities whose surface roughness Ra (arithmetic average roughness) is 1 to 200 μm, in the event that a texturing irregularity occurs, the texturing irregularity particularly becomes visible conspicuously. Because of this, in the related art, there has been imposed a limitation on the design of a surface roughness for the textured surface 21. According to the extension 10 of the vehicle lamp according to this embodiment, however, since a texturing irregularity is made difficult to occur, no limitation is imposed on the surface roughness design. Hence, it is possible to design extensions 10 of various designs. In addition, in the event that the surface roughness of the textured surface 21 is set to the aforesaid surface roughness, the transferring performance of minute irregularities to the textured surface 21 is improved, whereby the good looking textured surface 21 can be obtained. It is preferable that the surface roughness Ra of the textured surface 21 is in the range of 1 to 100 μm, and it is more preferable that the surface roughness Ra is in the range of 5 to 50 μm.

Additionally, it is preferable that the ribs 22 are provided so as to rise vertically from the designed surface 10a so that the ribs 22 are supported by the side walls 43 of the upper mold 40 in an ensured fashion.

(Second Textured Surface)

Figure 6:
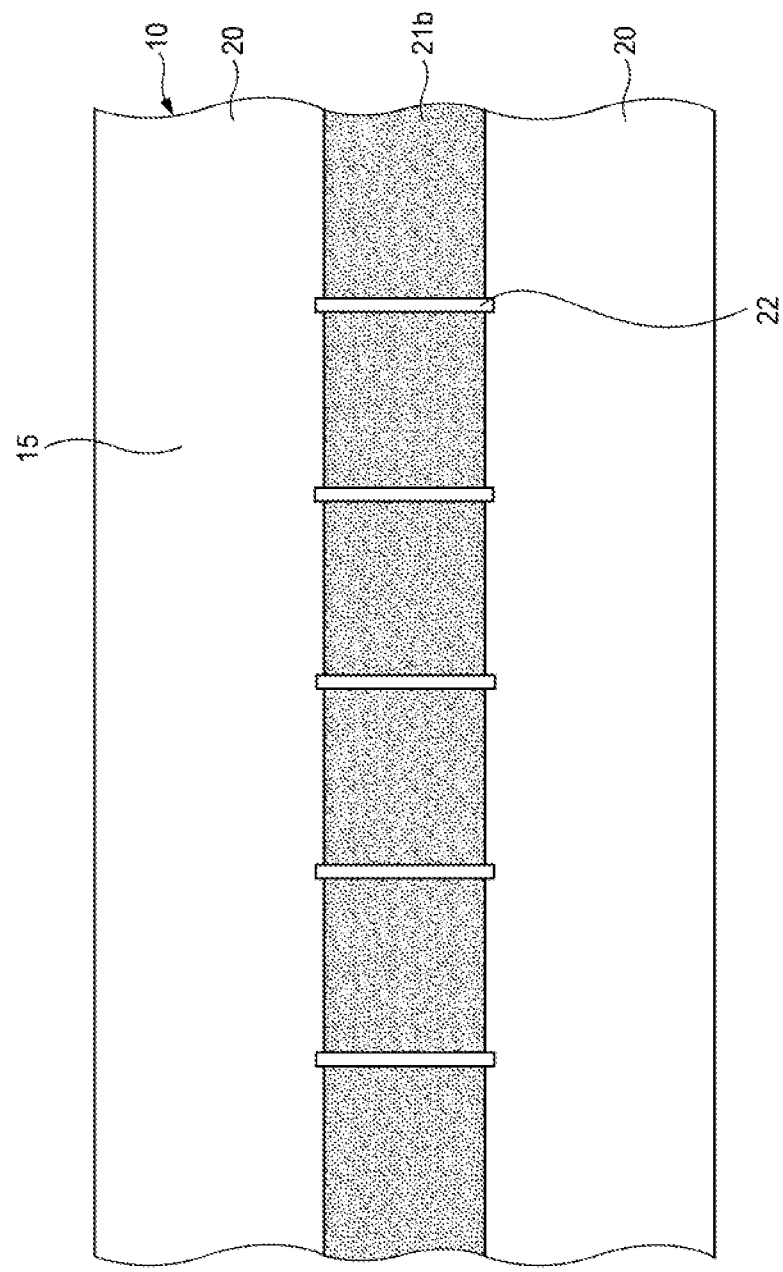
FIG. 6 is a partial enlarged view of the extension of the vehicle lamp shown in FIG. 1.

Note that the shape and forming position of the ribs 22 that suppress the occurrence of a texturing irregularity are not limited to those described above. FIG. 6 is a diagram showing in an enlarged fashion the periphery of second textured surfaces 21b which are formed on part of the inclined portion 12 of the extension 10.

As shown in FIGS. 2, 6, ribs 22 that are provided adjacent to the second textured surfaces 21b are formed so as to extend in a front-to-rear direction of the lamp to thereby divide the plurality of second textured surfaces 21b. The compression force F1 (compression force in the surface direction) applied to the resin while the extension 10 is being molded is also borne by these ribs 22 therebetween, thereby making it possible to suppress the occurrence of a texturing irregularity.

(First Modified Example)

Figure 7:
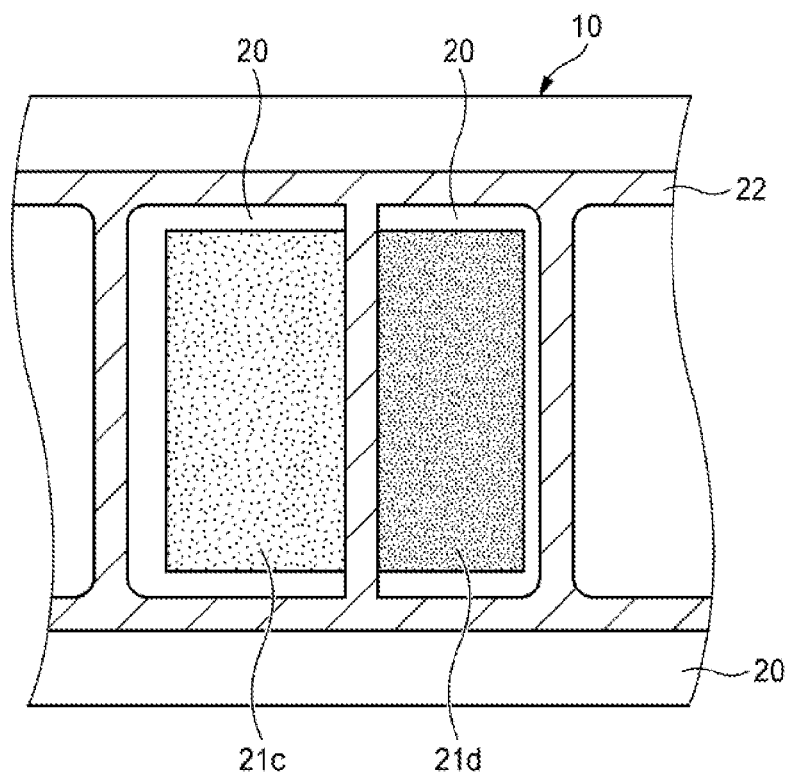
FIG. 7 is a partial enlarged view of an extension of a vehicle lamp according to a first modified example of the embodiment.

FIG. 7 is a partial enlarged view of an extension 10 of a vehicle lamp according to a first modified example of the embodiment. In the first modified example, two types of textured surfaces 21c, 21d which have different external appearances, mirror-finished surface portions 20 and ribs 22 are formed on a designed surface 10a. The ribs 22 are provided adjacent to the textured surfaces 21c, 21 and formed so as to surround the textured surfaces 21c, 21d, and the mirror-finished surface portions 20 are provided between the textured surfaces 21c, 21d and the ribs 22. As in this first modified example, the ribs 22 may be formed so that the mirror-finished surface portions 20 are provided between the textured surfaces 21c, 21d and themselves.

Additionally, according to the first modified example, since the textured surface 21c is surrounded by the ribs 22 along the full circumference thereof, the reaction force F2 can be applied from every direction by the ribs 22 against the compression force F1 that is applied to a resin so as to draw the textured surface 21c towards the center thereof, thereby making it possible to suppress effectively the occurrence of a texturing irregularity that would otherwise be generated over the whole of the textured surface 21c.

In addition, as shown in the figure, the rib 22 may be provided so as to mark the boundary between the two types of textured surfaces 21c, 21d which have the different external appearances. By providing the rib 22 at the boundary between the different textured surfaces 21c, 21d, it is possible to provide the extension 10 in which the individual textured surfaces 21c, 21d are emphasized.

(Second Modified Example)

Figure 8:
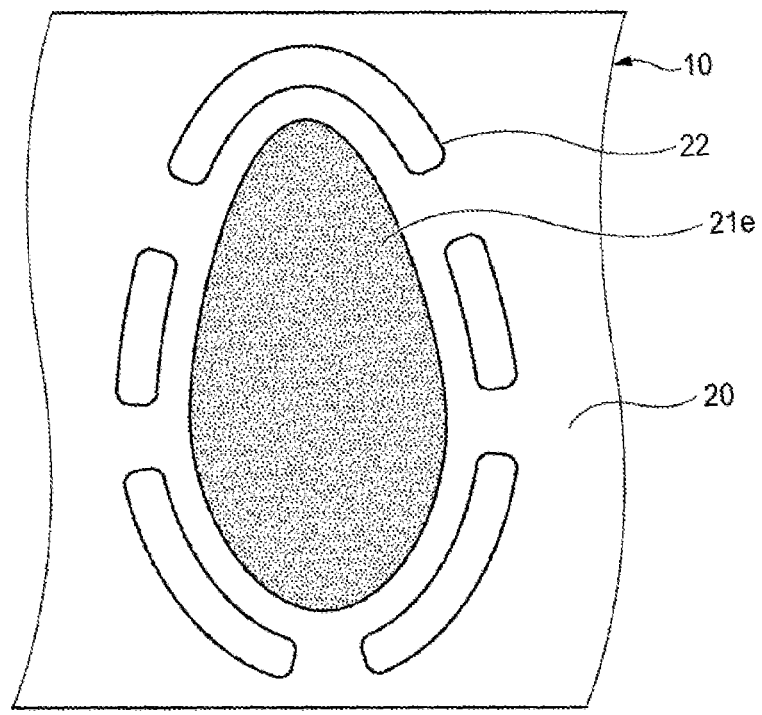
FIG. 8 is a partial enlarged view of an extension of a vehicle lamp according to a second modified example of the invention.

In the embodiment, while the textured surface 21 is described as having the substantially rectangular shape, the invention is not limited thereto. FIG. 8 is a partial enlarged view of an extension 10 of a vehicle lamp according to a second modified example of the invention. A textured surface 21e of the extension 10 shown in FIG. 8 is formed into a substantially oval shape. Ribs 22 are provided adjacent to the textured surface 21e and provided along an outline of the textured surface 21e. In this way, by providing the ribs 22 into the shape that follows the outline of the textured surface 21e, whatever shape the textured surface 21e may be designed into, the occurrence of a texturing irregularity can be suppressed.

In addition, as shown in the figures, the ribs 22 may be formed so as to so as to surround an outline of an area that corresponds to the textured surface 21e intermittently instead of being formed so as to surround it continuously. Alternatively, in place of the linear ribs 22 that extend on a designed surface 10a, a plurality of dome-shaped projections may be formed so as to surround the textured surface 21e, The occurrence of a texturing irregularity can also be suppressed by forming the ribs 22 or the projections in the way described above.

(Third Modified Example)

In addition, in the embodiment, while the textured surfaces 21 are described as being provided on the same surface, the invention is not limited thereto. FIG. 9 is a partial enlarged view of an extension 10 of a vehicle lamp according to a third modified example of the embodiment.

In the extension 10 of the vehicle lamp according to the third modified example shown in FIG. 9, a designed surface 10a is made up of two surfaces that meet at a bent portion 17. When framing textured surfaces 21f, 21g individually on the two designed surfaces 10a that are connected via the bent portion 17 in that way, a rib 22 may be provided on a designed surface 10a side of the bent portion 17. In this modified example, a ridge side of the bent portion 17 is described as being a side where the designed surfaces 10a are formed and the rib 22 is described as being provided on the ridge side of the bent portion 17. However, a root side of the bent portion 17 may be a side where the designed surfaces 10a are formed and a rib 22 may be provided so as to project from the root side of the bent portion 17.

Additionally, in this modified example, the rib 22 is provided only on one side of the textured surfaces 21f, 21g, and ribs 22 are not provided so as to hold the textured surfaces 21f, 21g therebetween. The occurrence of a texturing irregularity can also be suppressed by forming the rib 22 in the way described above. In this case, when the extension 10 is resin molded, the textured surfaces 21f, 21g are moved towards the rib 22 in whole by the compression force F1 produced in association with the resin being cooled, raised portions 21s of the textured surfaces 21f, 21g are deformed over the whole of the textured surfaces 21f, 21g. Consequently, since the raised portions 21s are deformed uniformly, the deformed raised portions 21s are not recognized as a texturing irregularity.

Thus, while the invention has been described based on the embodiment and the first to third modified example thereof, the invention is not limited thereto. For example, while the ribs 22 are used at the portions which suppress the occurrence of a texturing irregularity, projections or raised portions may be used in place of ribs 22, provided that those can produce a reaction force against the compression force which is produced when the resin component is resin molded.

In addition, in the embodiment and the modified examples, while the surface of the resin reflector is described as being used as the designed surface 10a as it is, a metal deposition treatment is applied to the designed surface 10a that is formed to include the mirror-finished surface portions 20 and the textured surfaces 21 so as to enhance the glossy appearance thereof.

Additionally, in the embodiment and the modified examples, while the extension 10 is described as the resin component, the invention can be applied generally to a resin component such as an inner lens or an outer lens, a reflector, or a lamp body that is disposed on the periphery of a light source and in which textured surfaces 21 are formed on a designed surface 10a. For example, in a vehicle lamp of a parabolic optical system, textured surfaces and ribs may be provided on areas that are not involved in light distribution by a reflector. Alternatively, when an inner surface of a lamp body is exposed to the front of the lamp, textured surfaces and ribs may be provided on the inner surface of the lamp body that functions as a designed surface. In this case, too, by providing the ribs, it is possible to suppress the occurrence of a texturing irregularity in the textured surfaces.

In addition, a function to enhance the external design properties of the extension 10 or a function to supplement the rigidity of the extension 10 may be given to the ribs 22 that suppress the occurrence of a texturing irregularity as described above.

Additionally, while the invention has been described based on the examples where the invention is applied to the vehicle headlamp, the invention may be applied to a vehicle indication lamp or a vehicle interior lamp.

In addition, the vehicle lamp according to the embodiment of the invention can be applied not only to a four-wheeled vehicle but also to a three- or two-wheeled vehicle.

What is claimed is:

1. A vehicle lamp comprising:
    a light source; and
    a resin component disposed on the periphery of the light source, the resin component having a designed surface that can be observed from the outside of the lamp, wherein
    the designed surface comprises a textured surface having minute irregularities; and a projecting portion provided adjacent to the textured surface, wherein
    a height of the projecting portion is equal to or larger than 0.2 mm and equal to or smaller than a thickness of the resin component at the portion where the textured surface is formed.

2. The vehicle lamp as set forth in claim 1, wherein
    the projecting portion has at least a pair of projecting portions provided in positions which face each other oppositely with the textured surface held therebetween.

3. The vehicle lamp as set forth in claim 1, wherein
    the textured surface has a plurality of textured surfaces formed on the designed surface, and wherein
    the projecting portion is provided at the boundary between the plurality of textured surfaces.

4. The vehicle lamp as set forth in claim 2, wherein
    the textured surface has a plurality of textured surfaces formed on the designed surface, and wherein
    the projecting portion is provided at the boundary between the plurality of textured surfaces.

* * * * *